UNITED STATES PATENT OFFICE.

HELEN BIERER, OF SAN FRANCISCO, CALIFORNIA.

METHOD OF PRESERVING EGGS.

SPECIFICATION forming part of Letters Patent No. 558,253, dated April 14, 1896.

Application filed April 16, 1895. Renewed December 24, 1895. Serial No. 573,194. (No specimens.)

*To all whom it may concern:*

Be it known that I, HELEN BIERER, a resident of San Francisco, in the county of San Francisco and State of California, have invented certain new and useful Improvements in the Art of Preserving Eggs; and I do hereby declare the following to be a full, clear, and exact description of the invention, such as will enable others skilled in the art to which it pertains to make and use the same.

The invention has for its object to preserve eggs or other articles in the shell; and it consists in the improvement in the art hereinafter described and particularly pointed out.

My method of preserving eggs comprises coating the same with particular substances that exclude light and air, and the packing of them in a suitable dry substance, such as bran, to prevent the changes of atmospheric temperature from affecting them. They are packed, by preference, with the small end down.

In preparing to coat the eggs lard is first melted and then removed from the fire. To each gallon of melted lard I add about two ounces of formic acid and four ounces of tincture of gum benzoin. These ingredients are well mixed and applied when cool to the eggs by a brush or other convenient means. The lard of the coating thus prepared and applied does not become rancid. The exact proportions of the ingredients are not essential, but I have given those which are suitable.

Eggs thus coated and packed in bran or the like will keep for six or more months practically unchanged and as good as fresh.

The improved method may be applied to other articles, such as fruit, provided with a skin or covering that will not absorb the coating to an injurious extent.

Having thus described my invention, what I claim is—

1. The improvement in the art of preserving eggs or the like which consists in coating them with a mixture of lard, formic acid and tincture of benzoin, substantially as set forth.

2. The improvement in the art of preserving eggs or the like which consists in coating them with a mixture of lard, formic acid and tincture of benzoin and packing them in a body of dry air-excluding substance, substantially as set forth.

In testimony whereof I have signed this specification in the presence of two subscribing witnesses.

HELEN BIERER.

Witnesses:
S. B. HUSKINS,
A. C. WHITE.